April 6, 1954 — E. C. GOODWIN — 2,674,676
ELECTRIC SWITCHGEAR OF THE COMPACT UNIT TYPE
Filed Sept. 15, 1948 — 2 Sheets-Sheet 1

Inventor
Edwin C. Goodwin
by John Stevens Lieb
Attorney

April 6, 1954     E. C. GOODWIN     2,674,676
ELECTRIC SWITCHGEAR OF THE COMPACT UNIT TYPE
Filed Sept. 15, 1948     2 Sheets-Sheet 2
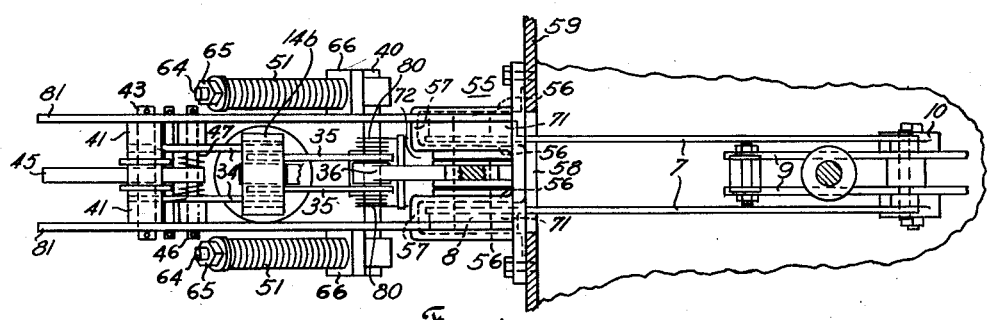
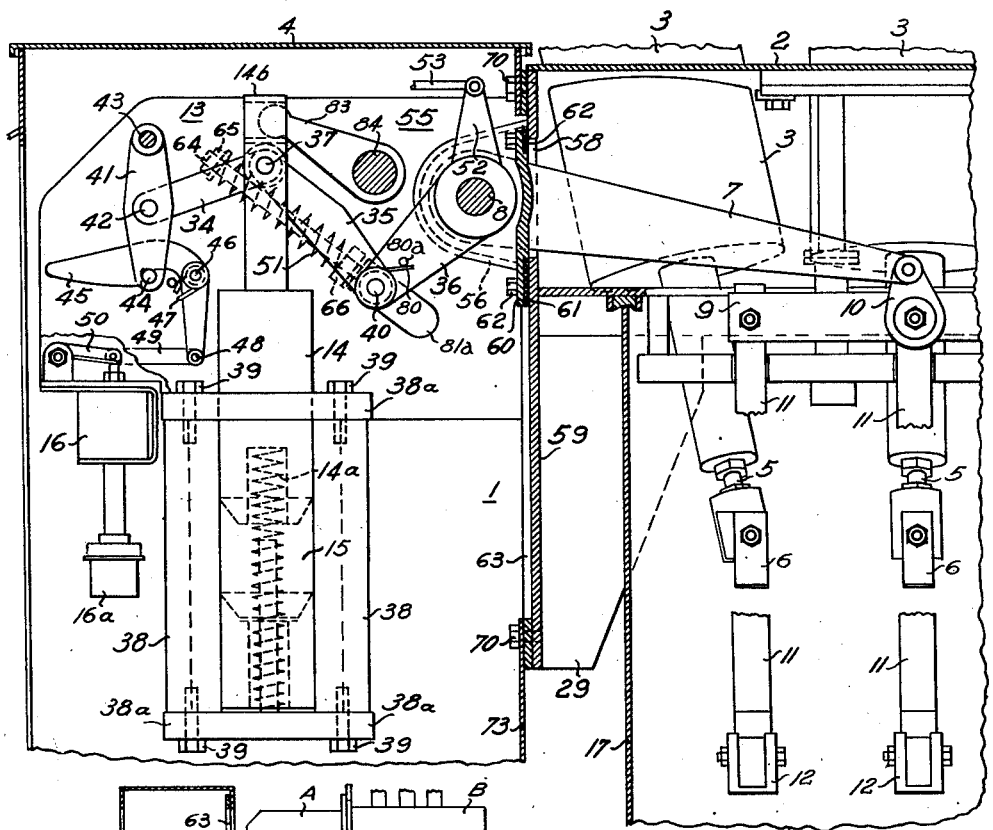
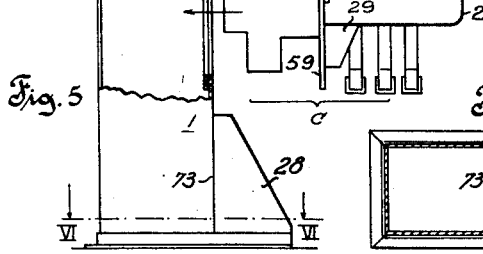

Patented Apr. 6, 1954

2,674,676

UNITED STATES PATENT OFFICE 2,674,676

ELECTRIC SWITCHGEAR OF THE COMPACT UNIT TYPE

Edwin C. Goodwin, Canton, Mass., assignor to Allis-Chalmers Manufacturing Company, Milwaukee, Wis., a corporation of Delaware Application September 15, 1948, Serial No. 49,373

2 Claims. (Cl. 200—168)

1

This invention relates to electric switchgear in general, and more particularly to electric switchgear of the compact unit type including an oil circuit breaker, a frame for supporting the circuit breaker, and a housing for accommodating the operating and control means for the circuit breaker.

A principal object of the invention is to provide improved switchgear which is more compart than any switchgear of the same general description which was known heretobefore.

Another object of the invention is to provide switchgear wherein one and the same structure serves the dual purpose of supporting the circuit breaker and of housing the operating and control means thereof.

Another object of the invention is to provide a switchgear unit having a more spacious housing for accommodating the operating and control means of the circuit breaker than the switchgear units which were known heretofore.

Circuit breakers require sometimes so many control means that it is impossible in conventionally designed switchgear, to accommodate all the control means in one single housing. It has become accepted practice in such instances to provide switchgear with an additional housing for accommodating the excess of control means that cannot be placed in the original housing.

It is therefore another object of the invention to provide improved switchgear having a housing so spacious that a large number of relatively bulky control means can be accommodated therein, in addition to the circuit breaker operating means, thus making it possible to dispense with any additional housing.

Another object of the invention is to provide switchgear including a tank-type oil circuit breaker wherein the contacts of the circuit breaker are readily accessible upon lowering of the tank, their accessibility not being impaired by surrounding or closely adjacent structure for supporting the circuit breaker.

Another object of the invention is to provide an electric switchgear unit including a tank-type oil circuit breaker wherein the oil tank can be lowered into a relatively open space unencumbered by any adjacent parts seriously limiting accessibility to the lowered oil tank, and wherein the tank can directly be lowered, if desired, upon a cart or similar vehicle for removal of the tank from the place where the switchgear unit is located.

Another object of the invention is to provide an improved compact and rugged switchgear unit that is suitable for outdoor service.

2

Another object of the invention is to provide a compact switchgear unit that can readily be assembled by combining a few self-sustained structural sub-units which, in turn, may be more or less completely bench-assembled.

Further objects and advantages will readily become apparent upon reading of the following specification taken in conjunction with the accompanying drawings, wherein:

Fig. 3 is a side elevation, on a larger scale, of the circuit breaker operating mechanism shown in Fig. 1;

Fig. 4 is a top plan view of the structure shown in Fig. 3;

Fig. 5 is a diagrammatic side elevation of a modification of the structure of Fig. 1; and Fig. 6 is a section along the plane VI—VI of Fig. 5.

Figure 2:
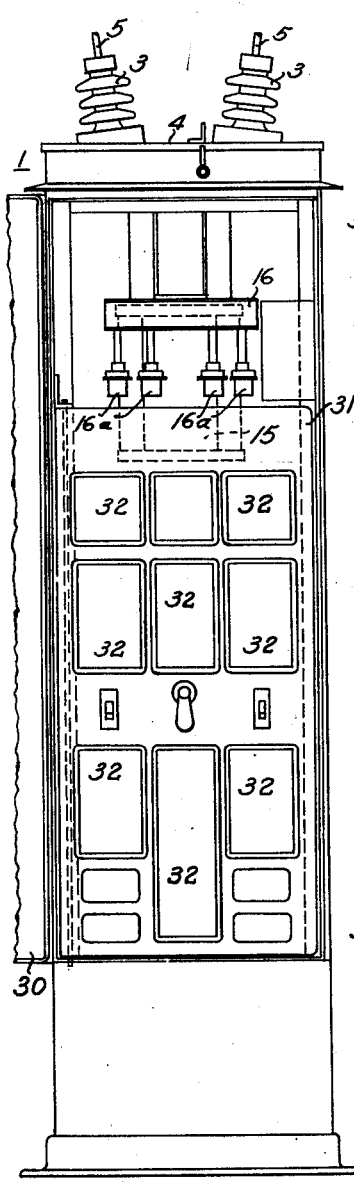
Fig. 2 is a front elevation of the structure shown in Fig. 1.
Figure 1:
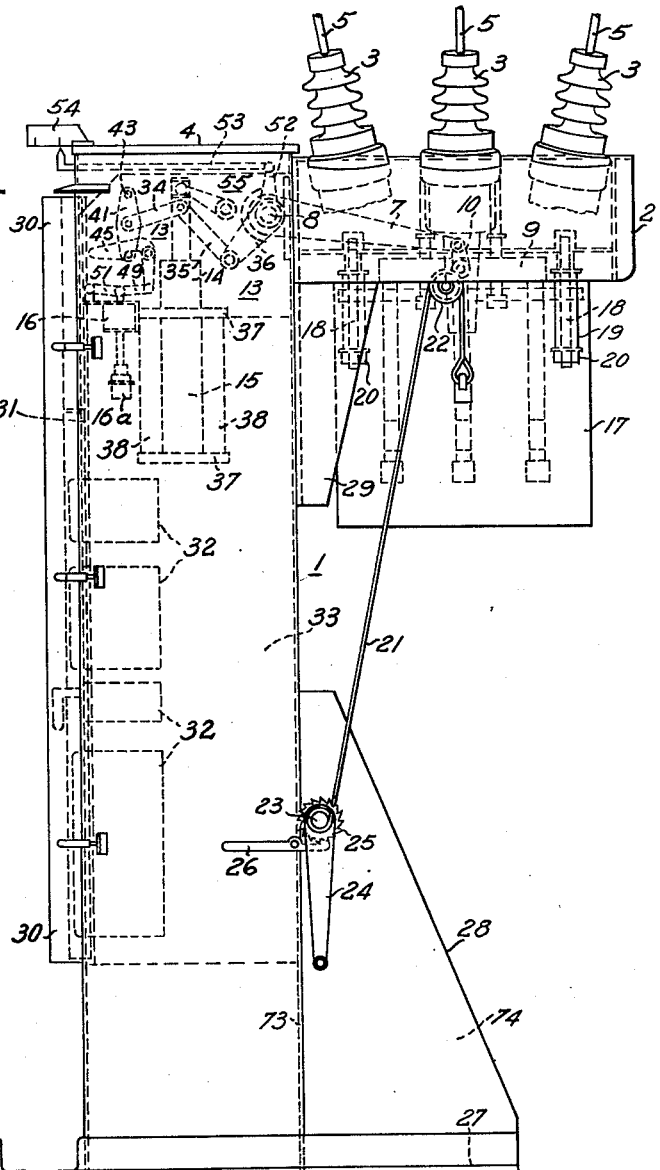
Fig. 1 is a side elevation of a preferred embodiment of the invention.

Referring now to Figs. 1 and 2, reference sign 1 indicates generally a housing which is preferably formed of welded sheet metal and which may be reinforced by iron sections. Housing structure 1 is of considerable dimensional strength and capable of supporting in cantilever fashion bushing support 2 for the support of bushings 3. Bushings 3 are of the type adapted for outdoor service and extend sufficiently above the level of the top 4 of housing 1 to provide a safe distance from any grounded parts, in particular from housing 1. Each of the bushings 3 is provided on the inside thereof with a stud 5. The lower ends of studs 5 carry stationary contacts 6 as can best be seen in Fig. 3. Rocking lever 7 pivotally supported by shaft 8 is adapted to raise or lower cross-beam 9 by means of link 10. Cross-beam 9 supports lift rods 11 which, in turn, support movable contacts 12. Movable contacts 12 are adapted to cooperate with the stationary contacts 6 for making the circuit. In the position shown in Fig. 3, the movable contacts 12 are disengaged from the stationary contacts 6, and hence the circuit is interrupted.

Housing 1 accommodates a toggle mechanism generally indicated by reference sign 13 for operating contact-actuating rocking lever 7. Toggle mechanism 13 is adapted to be operated by a plunger 14 of a solenoid 15. In the position of plunger 14 shown in Figs. 1 and 3 solenoid 15 is deenergized, and the plunger is held in its upper position by spring 14a, while cross-beam 9 is in its lower or open circuit position. Toggle mechanism 13 is controlled by tripping means including a plurality of tripping solenoids 16 of whch each is provided with a separate dashpot 16a. Contacts 6 and 12 are arranged in an oil tank 17 which is carried from, and closed by, bushing support 2. In the position of tank 17 shown in Fig. 1, four rods 18 depending from bushing support 2 engage holes provided in brackets 19 on oil tank 17. Screw nuts 20 on the lower ends of rods 18 engage brackets 19 on tank 17 and thus press tank 17 firmly against the bushing support or top frame 2. Upon removal of nuts 20 from rods 18, tank 17 is suspended by two cables 21 from bushing support 2. Cables 21 are arranged on opposite sides of oil tank 17 and one end of each cable 21 is attached to oil tank 17, while the opposite ends of cables 21 run over pulleys 22 and are secured to a winch which comprises shaft 23, crank 24, ratchet wheel 25 and ratchet 26. Upon disengagement of ratchet 26 and ratchet wheel 25, oil tank 17 may be lowered on a platform 27 which is but slightly above ground level. The right side of platform 27 forms a base extension of housing structure 1 and increases greatly the stability thereof without seriously limiting the accessibility of tank 17 when it is in its lowered position. Platform 27 and housing structure 1 are interconnected by a pair of lateral extension plates 28, the width of which is relatively large close to ground level and decreases at higher levels. On account of this fact the provision of plates 28 does not affect the accessibility of contacts 6, 12 upon lowering of tank 17 upon platform 27. The back wall 73 of housing structure 1 and the two extension plates 28 define a substantially U-shaped channel 74 adapted to receive oil tank 17 when lowered from bushing support or top frame 2. Upon lowering of oil tank 17 on the portion of platform 27 situated underneath of bushing support 2, tank 17 can readily be carted away since the portion of the platform on which the tank rests is readily accessible from the side of the platform opposite housing or frame structure 1.

A pair of lateral plates 29 secured to both housing structure 1 and bushing support 2 further increase the strength of the switchgear unit without impairing the access to contacts 6 and 12.

Bushing support 2 forms a cantilever which supports the circuit breaker in a position permitting access thereto, free from interference by housing or frame structure 1, on all sides of the circuit breaker, except the side thereof immediately adjacent structure 1. As clearly shown in Fig. 1, free accessibility from the side immediately adjacent housing structure 1 is not required, since the circuit breaker can conveniently be inspected and serviced from the three other sides. It will be noticed that structure 2 supports the bushings 3 of the circuit breaker in such a position as to permit convenient access thereto either from the top side and/or the bottom side of structure 2. Hence any inspection of the bushings 3 from either the top or bottom side does not offer any difficulty whatever.

A door 30 provided on the side of housing 1 opposite bushing support or cantilever structure 2 permits convenient access to the operating and controlling means arranged within housing 1. Opening of door 30 exposes an auxiliary panel 31 which supports various instruments 32, and is adapted to swing in door-fashion to an open position to expose any parts which may be arranged in the space 33 of housing 1 behind auxiliary panel 31. The geometrical axes about which door 30 and auxiliary panel 31 may be swung to their respective open position are both vertical and parallel, as clearly shown in Figs. 1 and 2.

Referring now more particularly to Figs. 3 and 4, these figures show a circuit breaker mechanism which constitutes a wholly bench-assembled, self-sustained structural unit that can easily be attached in a gas-tight manner to the circuit breaker, and more particularly to the bushing support thereof, and can be removed from it and replaced by a similar structural unit with like ease. The operating mechanism 13 includes operating toggle 34, 35, operating lever 36 on shaft 8 and rocking lever 7 which is likewise mounted on shaft 8. Rocking lever 7 is formed by two parallel elements and projects into the inside of bushing support 2, while toggle 34, 35 is arranged within housing 1. Toggle link 34 and toggle link 35 are joined together by pin 37 adapted to be acted upon by plunger 14 of solenoid 15. Solenoid 15 is arranged between two spaced parallel plates 38a, and the solenoid structure includes also spacing columns 38 and screws 39 The right end of toggle lever 35 is hinged to operating lever 36 by means of pin 40. The left side of toggle link 34 is secured to latch 41 by pin 42. Latch 41 is pivotally supported at 43 and provided with a pin 44 adapted to be engaged by bellcrank latch 45. Bellcrank latch 45 is pivoted at 46, acted upon by resetting spring 47 and pivoted at 48 to a toggle 49, 50. Toggle 49, 50 is normally slightly over center. If toggle 49, 50 is broken by the plunger of one of the tripping solenoids 16, pin 44 on lever 41 is free to rotate in a clockwise direction, as viewed in Fig. 3, about pin 43, resulting in opening of the breaker. Two accelerating springs 51, both acting upon shaft 40, tend to increase the speed of separation of contacts 6 and 12. Each of the two accelerating springs 51 is carried by one of a pair of rods 64 having on the upper end thereof a screw nut 65. Screw nuts 65 form abutments for the upper ends of springs 51, while the lower ends of springs 51 rest against abutment blocks 66. Abutment blocks 66 are each provided with a hole for the passage of rods 64 having their lower ends hingedly connected to shaft 40.

Plunger 14 is provided on the upper end thereof with an operating element 14b having substantially the shape of an inverted U and adapted to act upon toggle 34, 35 when plunger 14 is moved in a downward direction to close the breaker. Element 14b may also be moved manually by lever 83 rotatable about shaft 84.

Following a tripping operation, torsion or rattrap resetting springs 80 on shaft 40 acting on pin 80a on lever 36 tend to reset toggle 34, 35 and lever 41 to their position shown in Fig. 3 by rotating toggle link 35 about shaft 40 in a clockwise direction.

Operating mechanism 13 proper is arranged in the space formed between and is supported by the two parallel plates 81 and the helical accelerating springs 51 are arranged in the space immediately adjacent to, and outside of, plates 81. Plates 81 are provided with apertures 81a for the passage of shaft 40.

As shown in Fig. 3, shaft 8 may be provided with an arm 52 controlling an indicator rod 53. The latter controls an indicator 54 arranged externally of housing 1, as shown in Fig. 1.

Fig. 3 shows the circuit breaker in open circuit position. Plunger 14 is held in its upper position by resetting spring 14a. If solenoid 15 is being energized, plunger 14 moves in a downward direction against the action of spring 14a, moving toggle 34, 35 slightly over center. This motion of toggle 34, 35 causes rotation of arm 36, shaft 8, and rocking lever 7 in a counterclockwise direction, as viewed in Fig. 3. Hence arm 7 is raised, resulting in raising of crossbeam 9, lift rods 11 and movable contacts 12. The circuit is closed upon engagement by contacts 12 of contacts 6.

Shaft 8 is supported by a bearing member formed by a casting and generally indicated at 55. Bearing member 55 comprises four parallel vertical wall sections 56 forming an integral part thereof. The two wall sections 57 are arranged at right angles to the four wall sections 56 and form likewise an integral part of bearing member 55. Wall sections 56 and 57 form a continuous wall structure adapted to be intersected at more than two points by the geometrical axis of shaft 8. In the present embodiment of the invention, the continuous wall structure 56, 57 is intersected at four points by the geometrical axis of shaft 8, since each of the four parallel wall sections 56 is being intersected by it. Shaft 8 is supported at these four points of intersection by bearings of which one is arranged in each of wall sections 56. Bearing member 55 defines a group of three pockets 71, 72, 71 having open entrance portions and closed back portions. The entrance portion of the axially outer pockets 71 is situated at the side of shaft 8 opposite the entrance portion of the axially inner pocket 72. It appears from Fig. 4 that the portion or section of shaft 8 which is located between the two axially inner wall sections 56 is situated on the left side of wall structure 56, 57, while the portions or sections of shaft 8, which are located each between one axially inner and one axially outer wall portion 56, are situated on the right side of wall structure 56, 57. The portion of shaft 8 situated on the left side of wall structure 56, 57 is actuated by lever 36 likewise situated on the left side of wall structure 56, 57. The two portions of shaft 8 situated on the right side of wall structure 56, 57 actuate rocking lever 7 likewise situated on the right side of wall structure 56, 57. Member 55 is adapted to form a substantially gas-tight seal for an aperture which, in the instant case, is an aperture 58 for the passage of lever 7 in the rear wall 59 of cantilever structure 2. In order to form a substantially gas-tight seal for aperture 58, member 55 is provided on the periphery thereof with a mounting flange 60, arranged in a plane parallel to shaft 8. Flange 60 is provided with a gasket 61 and with means as, for instance, screws 62, permitting to attach flange 60 and with it member 55 in a non-permanent way to some other structure. As shown in Fig. 3, the screws 62 were used to attach flange 60, and with it the complete operating mechanism 13, forming together with member 55 a bench-assembled, self-sustaining unit, to the rear wall 59 of cantilever structure 2. The leakage of oil vapors from tank 17 and cantilever structure 2 through bearing member 55 into housing 1 is so insignificant that it can safely be neglected. Screws 70 secure cantilever structure 2 and operating mechanism 13 to housing 1.

In the manufacture of the switchgear unit a subassembly unit is formed which comprises the operating mechanism 13, the bearing member 55 and the lever 7 for operating cross-beam 9. This subassembly unit has been indicated in Fig. 5 by reference sign A. Subassembly unit A is then attached to the bushing support 2, which, together with the parts supposed to be associated with it, may form another subassembly unit B. The next larger subassembly unit obtained by uniting subassembly units A and B, i. e., by attaching flange 60 of bearing member 55 by means of screws 62 to rear wall 59 of bushing support 2, has generally been indicated in Fig. 5 by reference sign C. Upon having formed subassembly unit C the operating mechanism 13 and the solenoid structure 14, 15, 38, 38a are introduced into an opening 63 formed in housing 1 and arranged on the side thereof opposite of door 30. Opening 63 may be made sufficiently large to move operating mechanism 13 and solenoid structure 14, 15, 38, 38a perfectly horizontally into housing 1, which facilitates the assembly process since it eliminates the need of tilting subassembly C for introducing parts 13 and 14, 15, 38, 38a into housing 1. Upon completion of the assembly process, the large opening 63 in housing 1 is completely covered up by plate 59 forming the rear end of bushing support 2.

The usefulness of a subunit of the general character of unit A, i. e., of a unit which includes operating and motor means, can readily be attached to, and removed from, any other circuit breaker structure, and which is adapted to transmit the motion of the motor means across a substantially gas-tight element, is not limited to cantilever switchgear according to the present invention. Such a submit can evidently be used in connection with various other types of switchgear.

It will also be apparent to any one skilled in the art that any other circuit breaker operating motor means could be substituted, if desired, for the solenoid 15 shown in the preferred embodiment of the invention without departing from the spirit or scope thereof. Similarly, any other suitable operating mechanism could be substituted, if desired, for the particular linkage 13 shown in the preferred embodiment of the invention.

The operation of the switchgear unit shown in the drawings is not unlike that of switchgear units of conventional design. Energization of operating solenoid 15 results in closing of the circuit breaker, as more fully set forth above. Opening of the circuit breaker is initiated by energizing tripping solenoids 16, thus causing collapse of toggle 49, 50. This permits accelerating springs 51 to effect opening of the circuit breaker by rotating shaft 8 in a clockwise direction as viewed in Fig. 3. Fig. 3 shows the position of the parts of the circuit breaker upon interruption of the circuit. Solenoid 15 is not energized. Consequently resetting spring 14a keeps plunger 14 in the upper position thereof. When solenoid 15 is energized, plunger 14 is moved in a downward direction. In the lower position of plunger 14, toggle 34, 35 is slightly over center, but resetting spring 14a is not able to move toggle 34, 35 in an upward direction, even though solenoid may be deenergized, on account of the action of accelerating springs 51 which, in that position of toggle 34, 35, exert a force component in toggle link 35 tending to move pin 37 in a downward direction. When tripping solenoid 16 is energized, toggle 49, 50 is caused to collapse as stated above. Upon collapse of toggle 49, 50 a force component derived from accelerating springs 51 rotates lever 41 in a clockwise direction, as viewed in Fig. 3, about pin 43. Lever 41, in turn, rotates lever 45 against the action of resetting spring 47 in a clockwise direction. Substantially simultaneously springs 51 rotate arm 36, shaft 8 and rocking lever 7 in a clockwise direction, as viewed in Fig. 3. Subsequent expansion of resetting spring 80 causes raising of center pin 37 of toggle 34, 35 to the position shown in Fig. 3, in which position latch 45 reengages pin 44 under the bias of resetting spring 47, thus making the circuit breaker ready for another closing operation.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. Electric switchgear of the compact unit type comprising a vertical column forming a housing, said housing having an opening on one side thereof for receiving a self-sustained structural unit comprising an oil circuit breaker, a box like structure comprising a rear wall secured to said housing, a pair of side members and a cover secured to said read wall and to said side members, a plurality of bushings, an oil tank, and means for operating and controlling said circuit breaker, said cover of said box like structure forming a support for said bushings and a cover for said oil tank, said operating and controlling means arranged to protrude into said housing through said opening to cause said selfsustained structural unit to form with said housing a cantilever structure.

2. Electric switchgear of the compact unit type comprising a vertical column forming a housing, said housing having an opening on one side thereof for receiving a self-sustained structural unit comprising an oil circuit breaker, a box like structure comprising a rear wall secured to said housing, a pair of side members and a cover secured to said rear wall and to said side members, a plurality of bushings, an oil tank, means for operating and controlling said circuit breaker, said cover of said box like structure forming a support for said bushings and a cover for said oil tank, said operating and controlling means arranged to protrude into said housing through said opening to cause said self-sustained structural unit to form with said housing a cantilever structure, and a door structure on said housing permitting access to said operating and controlling means when self-sustained structural unit is combined with said housing to form a cantilever structure.

References Cited in the file of this patent

UNITED STATES PATENTS

| Number | Name | Date |
|---|---|---|
| 1,142,847 | Schildhauer | June 15, 1915 |
| 1,390,036 | Jacobs | Sept. 6, 1921 |
| 1,563,831 | Burnham | Dec. 1, 1925 |
| 1,621,368 | Hilliard | Mar. 15, 1927 |
| 1,624,361 | Ow | Apr. 12, 1927 |
| 1,816,034 | Wood | July 28, 1931 |
| 1,825,159 | Pinkham | Sept. 29, 1931 |
| 2,035,771 | Thumim | Mar. 31, 1936 |
| 2,050,323 | Hobbs | Aug. 11, 1936 |
| 2,135,250 | Cole | Nov. 1, v938 |
| 2,264,755 | Johnson | Dec. 2, 1941 |
| 2,282,232 | MacDonald et al. | May 5, 1942 |
| 2,376,471 | Bevan | May 22, 1945 |
| 2,391,681 | Craig | Dec. 25, 1945 |
| 2,408,309 | Harrison | Sept. 24, 1946 |
| 2,460,450 | Cumming | Feb. 1, 1949 |
| 2,460,462 | Lingal | Feb. 1, 1949 |

FOREIGN PATENTS

| Number | Country | Date |
|---|---|---|
| 460,971 | Great Britain | Feb. 8, 1937 |
| 490,586 | Germany | Jan. 30, 1930 |